C. W. SIEMENS.
Revolving Furnace with Regenerators.

No. 201,294. Patented March 12, 1878.

Witnesses.
B. C. Pole
W. B. Chaffee

Inventor
C William Siemens
by
Chas S. Whitman
atty

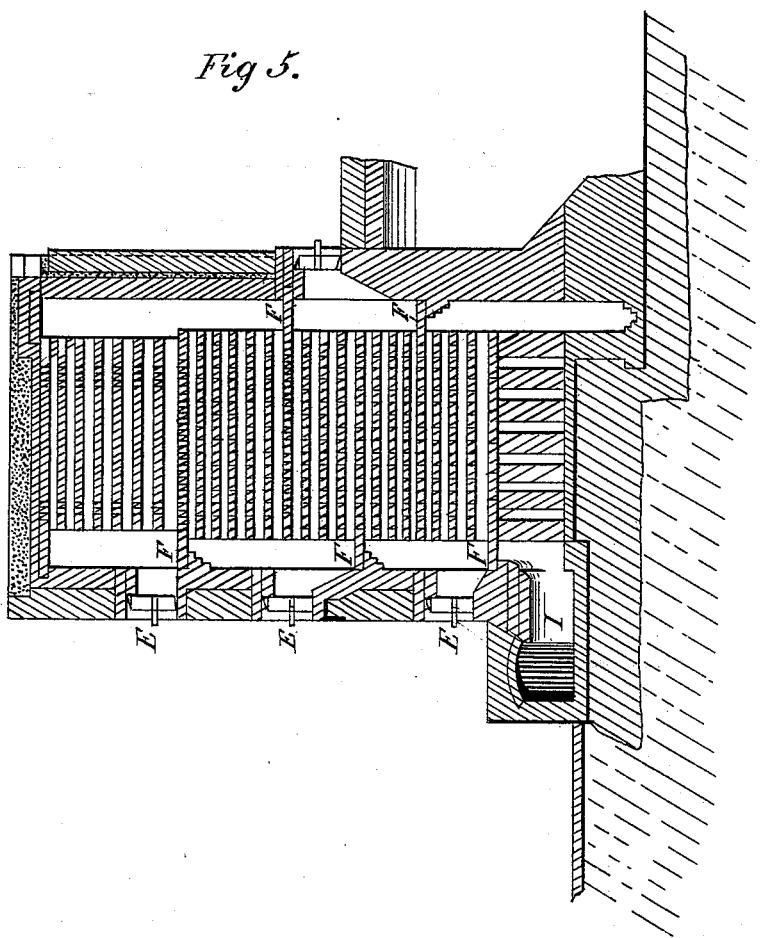

UNITED STATES PATENT OFFICE.

CHARLES W. SIEMENS, OF WESTMINSTER, ENGLAND.

IMPROVEMENT IN REVOLVING FURNACES WITH REGENERATORS.

Specification forming part of Letters Patent No. 201,294, dated March 12, 1878; application filed June 29, 1876.

*To all whom it may concern:*

Be it known that I, CHARLES WILLIAM SIEMENS, of Westminster, in the county of Middlesex, England, have invented an Improved Process and Apparatus for the Manufacture of Iron and Steel; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to that class of rotative regenerative furnaces which are made use of for the manufacture of iron and steel; and the nature thereof consists in certain improvements in the construction of the same, whereby, first, air only passes through the reversible regenerators to the furnace, and gas enters the rotative chamber in a continuous manner from the source of supply, (see English Patent No. 671, of 1866;) secondly, the gas-inlet at the rotator-mouth is situated below and between the air and combustion-product passages; thirdly, the gas is heated by the outgoing products of combustion; and, fourthly, the neck-like extension of the regenerators and the neck of the rotator are prevented from becoming overheated.

Figure 1:
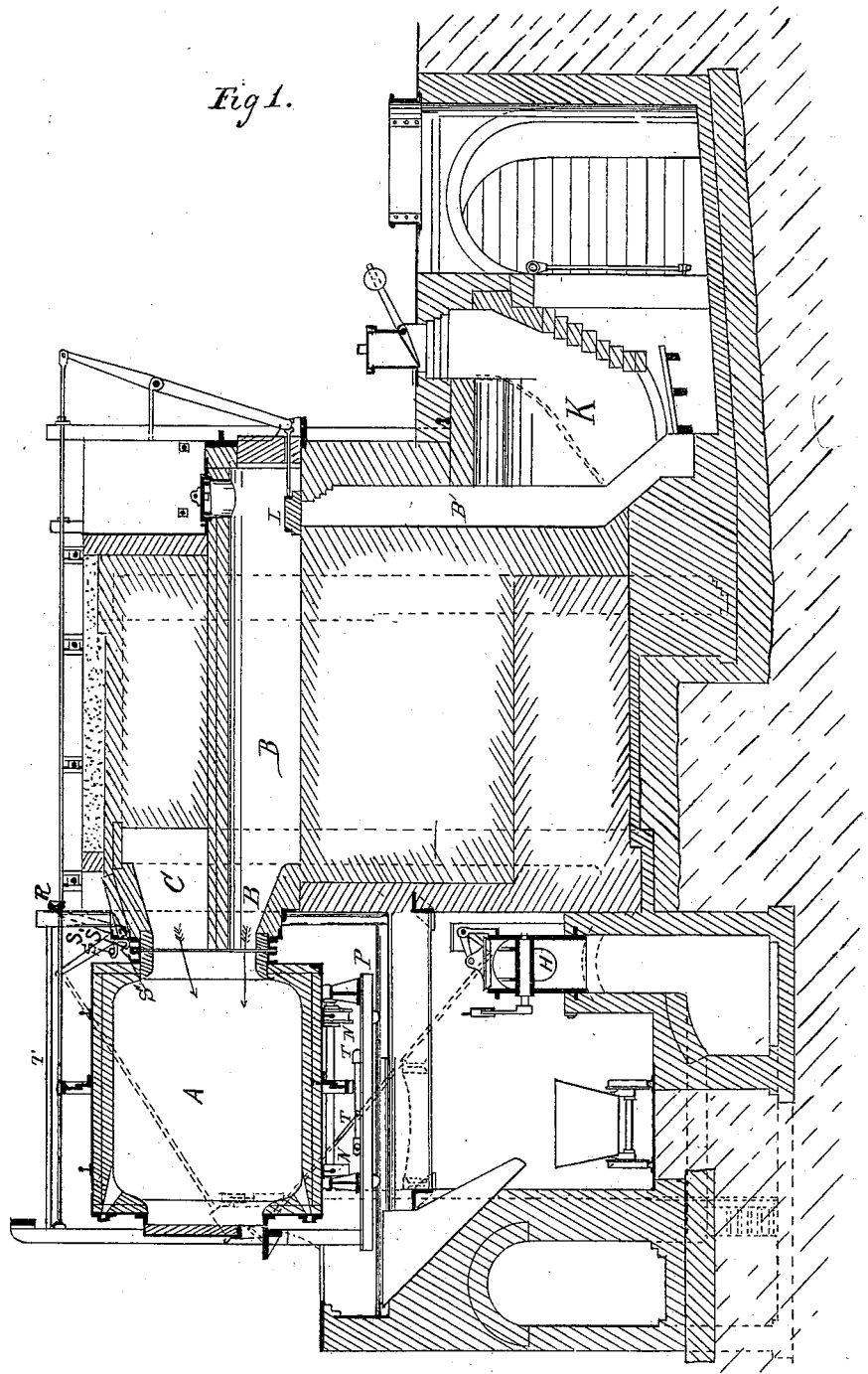
Figure 2:
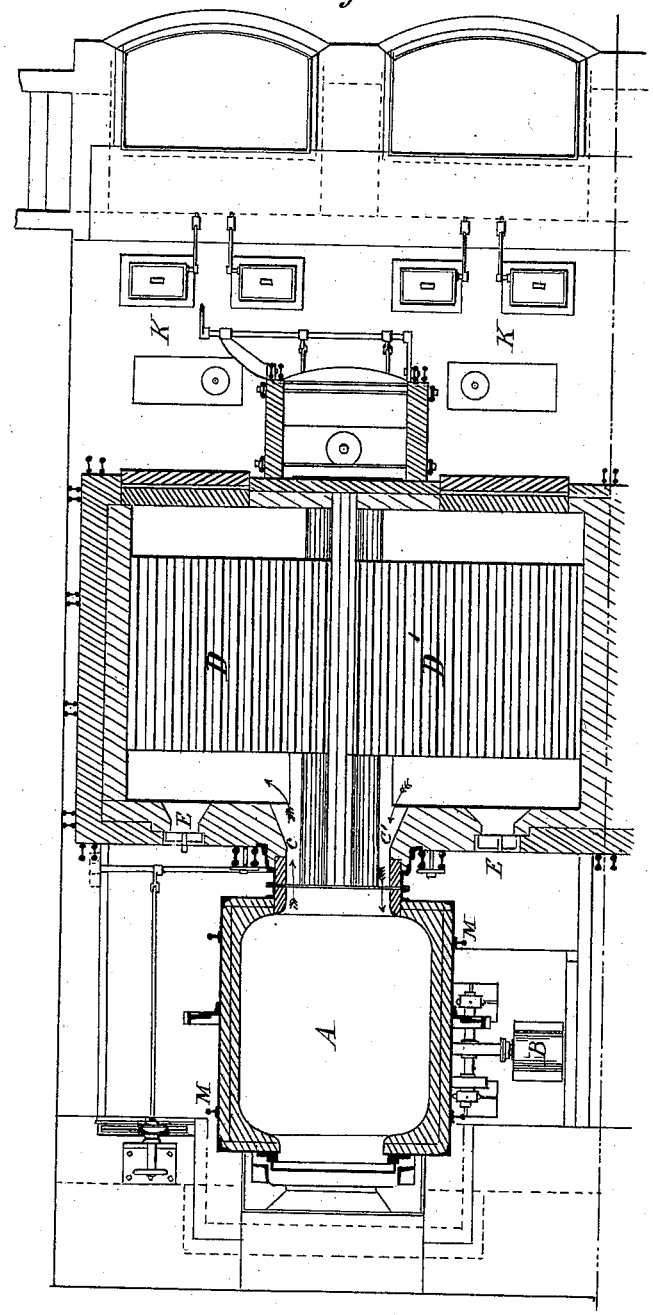
Figure 3:
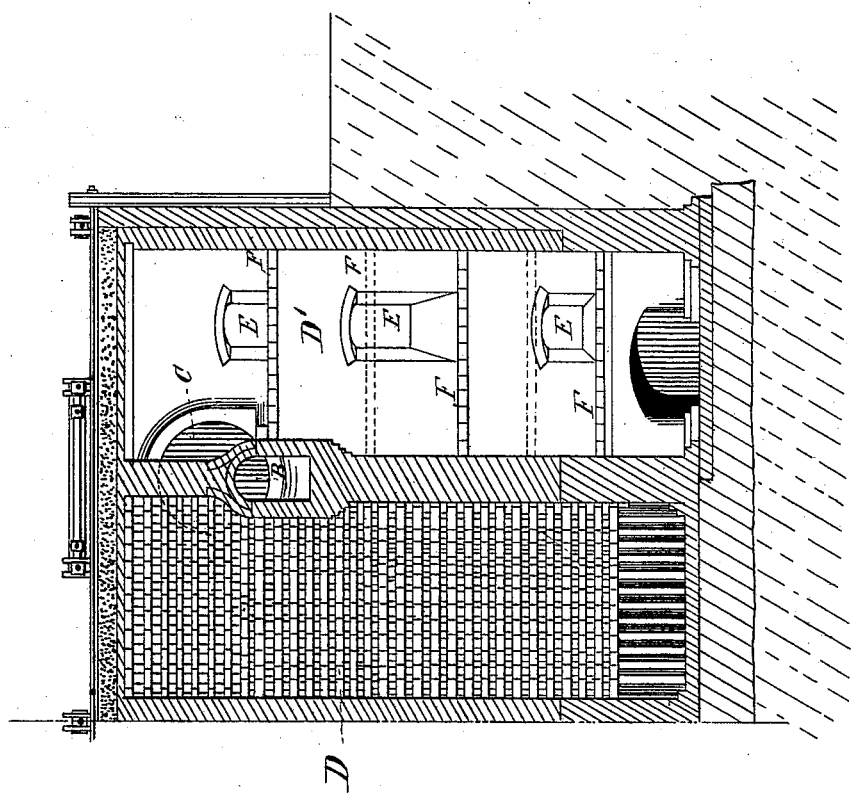
Figure 4:
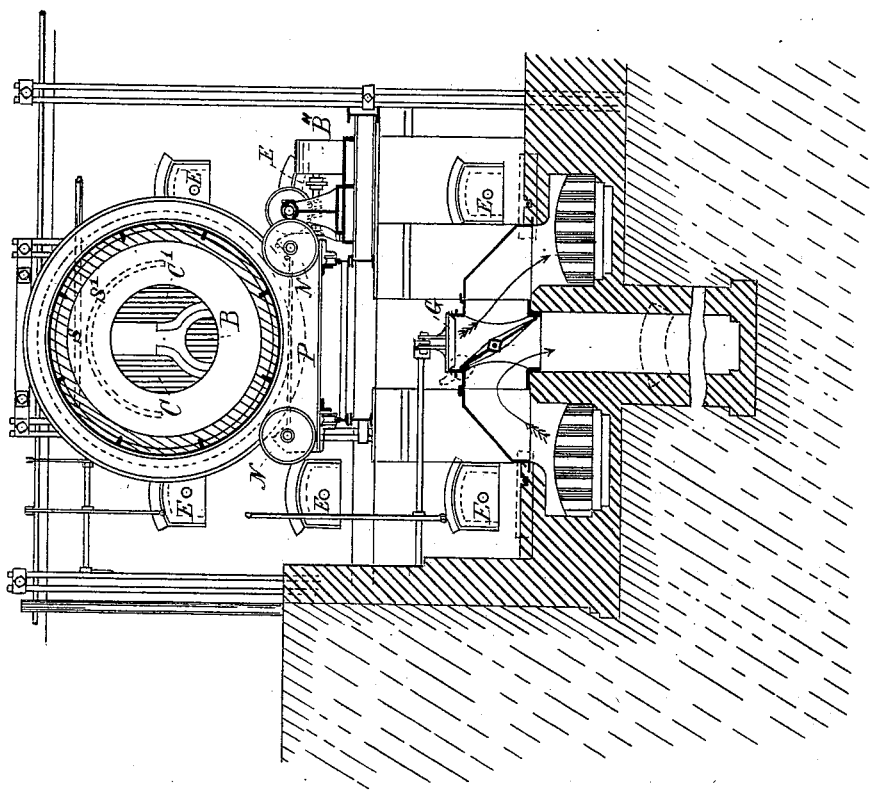

Figure 1 represents a longitudinal section. Fig. 2 is a sectional plan. Fig. 3 represents a transverse section. Fig. 4 represents a sectional elevation. Fig. 5 is a transverse section.

A is the rotative furnace, in shape cylindrical, with flat ends. It is mounted on rollers, and, instead of clutch-gearing, each furnace may be driven by a small independent engine. The throat or neck of the furnace A is in communication with three flues, B and C C'. The lower opening B is for gas only, and the flue B' brings it direct from the producers K K' at the back. The two lateral parts C C' communicate, respectively, with the regenerators D D'. These regenerators are used for heating air only, and are built in stages, provided with cleaning-doors E. The bricks are laid so as to form longitudinal channels, and at intervals stoppings F are carried across, as shown in Fig. 5, so that the air and products of combustion going to and from the furnace pass backward and forward several times, and thus the air becomes intensely heated before entering the furnace, while the products of combustion deposit their heat on their way to the chimney.

This construction may be varied by building the upper portion only of the regenerators in channels, while the lower part may be filled with the ordinary regenerator checker-work. This channel or cellular construction gives great facilities for cleaning the regenerators from any dust or matter carried over from the rotative chamber, and may also be used where gas and air regenerators are employed. With some ores this deposit is considerable, and involves occasional cleaning. To avoid, in a great measure, this dust deposit, all the valves should be closed and the chimney-damper put down during charging, and, if circumstances permit, the rotative chamber may be run forward and a stopper placed over the furnace-throat.

G is the regulating-valve by which air is admitted to the furnace, and communicates with the regenerators D D' by means of the reversing-valve H. The air flows in on one side of the flap H into one regenerator, while the products of combustion coming from the furnace pass from the other regenerator to the other side of the flap H, and thence to the chimney-flue I; thus, when one regenerator is heated sufficiently by the issuing products of combustion and the other is cooled by the incoming air, a reversal of the flap H effects a change in the direction of the currents, and the heat accumulated is returned to the furnace.

The gas-producers K K' are of my usual well-known construction, and therefore need no description.

The gas produced rises from the producers K K' continuously, and flows out hot through the regulating slide-valves L—of which two are shown, one to each producer—into the gas-flue B, along which it passes to the rotative chamber A. Thus the gaseous or other fuel flows in continuously through the port B, while the lateral ports C C' serve alternately to give ingress to the hot air and egress to the products of combustion. This course is shown in one direction by the arrows.

The rotative chamber A is constructed of wrought-iron plates, bound together by strips, and angle-iron riveted on and further secured by two rings of rails, (shown at M M,) which also serve to support the chamber on the rollers N N. The whole is placed on a carriage, P, made of cast and wrought iron, and resting on four wheels running on a pair of rails. Thus the rotative chamber may be moved toward or away from the regenerator-neck.

The rotary motion is shown as imparted by a small and independent engine, B'', provided with suitable gearing. There may be one such engine to each furnace, and this arrangement may be used instead of the clutch-gearing described in my previous patent. This engine may also be connected with the carriage P, and employed for moving the rotative chamber A to or from the regenerator-neck. The neck of the furnace opposite the door is composed of two channel-irons, or of iron plates bent U-shaped. They are circular pieces, one fastened onto the back plate of the rotative chamber A and the other similarly secured to the neck-like extension of the regenerator-flues, which also is made of wrought-iron plates firmly riveted together, and kept in position by the buck-staves and tie-bolts R. Above the neck-joint a perforated pipe, S, sends a spray of water over the plates and neck, to prevent their corrosion by the flame. The water is prevented from entering the neck-joint by the semicircular piece of angle-iron S' immediately below the perforated pipe S.

At T are shown the perforated tubes for projecting water upon the casing of A, in order to cool the furnace-lining, and for other purposes. The rotative chamber A may be also cooled by making the casing hollow, and allowing water to circulate in the annular space.

This form of furnace, as above described, is well adapted for the use of petroleum or other oil vapors, or for powdered fuel, as well as for the ordinary gaseous combustibles.

In making the lining of the rotative chamber, scale or other oxides of iron, as also oxides of manganese, chromium, or titanium, may be used together or separately, or in combination with a rich cinder, such as that obtained from reheating and puddling furnaces. A rich aluminous cinder is also very useful for admixture in certain cases.

In using an oxide lining I operate as follows: On the rotator-casing, protected by brick-work or otherwise, an initial lining of oxide of iron is first melted and set round to the depth of a few inches; then a charge of oxide and rich cinder mixed is melted and set round. On this bed an ordinary charge of ores, fluxes, &c., is worked. When the charge has come to the metallic condition and the iron is partly aggregated, the fluid scoria is tapped off in the usual manner, the heat is then raised, the balls are formed, and at the same time a second cinder appears, derived partly from the balls and partly from the lining. This, under proper management, should be a true welding-cinder of the approximate formula $2FeOSiO_2$. After the balls are taken out this cinder is not tapped off, but is enriched by the addition of some of the above-mentioned oxides. Some of it is then splashed onto the furnace ends, and the remainder is allowed to set, so as to form a new working-face for the lining. In order to cool the furnace for this purpose, the admission of air and gas is stopped or greatly diminished, and water is projected onto the casing in jets from perforated tubes placed above and below on the outside of the rotative chamber. If the lining is to be increased all round, the chamber is allowed to rotate slowly while the cooling takes place; but if it be desirable to form a flat side to the lining, to prevent the sliding of subsequent charges, the rotation is stopped, and, after enriching the cinder with scale or other oxides, lumps of titanium or chrome ores, or of other refractory materials—such, for example, as large pieces of rich calcined ironstone or lumps of hematite or magnetic iron ore, which, by preference, have been previously warmed to avoid decrepitation—are thrown into the bath and well coated with cinder. The water is then turned onto the bottom of the rotative chamber, and the flat is quickly solidified. The lumps set in give a rough surface, and not only materially assist in preventing the charge from sliding, but also help to keep it continually turning over and exposing fresh surfaces to the action of the flame. In this way each charge contributes to the lining for the subsequent one, and loss of iron is avoided.

A carbon or carbonaceous lining, instead of wood, may be used with advantage, especially if fluid steel, spiegel, ferro-manganese, or spongy iron are to be formed. For such purposes I use graphite (plumbago) or the graphitic deposit formed in gas-retorts. Anthracite or coke may also be employed. These materials are to be ground up and mixed with about twenty-five per cent. of fire-clay, so as to form a thick pasty mass, which is then rammed into position or molded into suitable blocks for lining the furnace.

Having now described the improvements in my rotative furnace and the mode of forming the lining, I will proceed to explain my new method of working.

The ores, reducing agents, and fluxes to be used are first crushed small enough to pass through holes about three-eighths of an inch diameter; then, if the ores contain volatile matter, they may be charged into a rotary calciner heated with an ordinary fire, or, by preference, with gaseous fuel from the producers. This calciner is made large enough to contain sufficient ore for several rotator charges, and is made to slope gently toward the fire end, where there is a large chute provided with an iron door. The calcined ore descends to this door, whence it is taken out and may be charged hot into the rotator, as required. The hot ore from the calciner is mixed with a suitable proportion of reducing agents and fluxes.

In selecting the fluxes my aim is to form a slag easily fusible, and capable of carrying off the sulphur, phosphorus, and earthy matters in the charge at the first tapping, which takes place at a comparatively low temperature, and just as the reduced iron begins to aggregate. If the ore be silicated, bases, such as lime and alumina, should be added; or if it be a basic ore, then silica must be added. In either case the oxygen in the silica, as $SiO_2$, should be at least about half that contained in the bases. If these conditions be assured, only a small quantity of iron will be carried off in the slag.

If the ore contains much sulphur and phosphorus and refractory earthy matters, I add an ore containing manganese, so as to insure a fusible and cleansing slag at the first tapping.

The mixture of ore, flux, and reducing agents is charged into the heated rotative chamber, and rotation slowly commenced as soon as the charge is heated up thoroughly and the slag begins to run. The heat is then slightly raised until the reduced spongy pieces of iron begin to aggregate in a bath of slag. This is now nearly all tapped off, and the heat is then raised to the welding-point of iron. At this stage some of the lining begins to melt, and a second small bath of cinder is formed, in which the balling up goes on rapidly. As soon as ready, the balls are quickly removed, and shingled straight into blooms, and rolled into puddled bars. This cinder, which is approximately a true welding-cinder of the composition $2FeOSiO_2$, is not tapped off, but is at once set round or in a flat, being cooled by the water from the perforated tubes below the rotator, and the furnace is ready for the next charge.

From time to time the welding-cinder should be enriched and lumps set in, as previously described.

If hard-grained or steely iron be required, I add granulated pig metal, refined metal, spiegel, or ferro-manganese to the charge immediately after the first tapping. The carbon becomes associated with the iron in the charge, while the silicon and manganese go into the cinder, to be set around as lining. In the charge which follows, the manganese silicate comes out in the first tapping, and serves to cleanse the charge from impurities.

I also use my rotative regenerative gas-furnace for the manufacture of spongy iron. For this purpose calcined or raw iron ore or scale is charged into the revolving chamber with sufficient carbonaceous matter to effect the complete reduction of the iron, great care being taken so to regulate the supply of air and gas that there shall always be a slight excess of gas in the rotative chamber, so that the temperature shall not rise too high, nor shall the reduced iron be exposed to oxidation. The charge is slowly rotated, and at the moment when reduction is complete, and just before fusion sets in, the air is shut off, and only the gas kept on with a good outward pressure to avoid indrafts. The spongy iron is then discharged into closed receivers, in which a reducing-atmosphere is maintained by the addition of powdered carbonaceous matter or oil, and there kept until quite cold.

The process of manufacturing iron herein described forms the subject-matter of another application which has been duly filed in the United States Patent Office.

Having thus described the nature of my invention, and the manner in which the same is to be practically carried out, I claim—

1. A rotative regenerative furnace in which air only passes through the reversible regenerators to the furnace, and gas enters the rotative chamber in a continuous manner from the source of supply.

2. A rotative regenerative furnace in which the gas-inlet at the rotator-mouth is situated below and between the air and combustion-product passages.

3. The combination, with the regenerators, of a horizontal flue passing between the upper part of the two regenerators, and communicating with the gas-supply, whereby the gas is heated by the outgoing products of combustion, as and for the purposes described.

4. The combination of the water-discharge pipe, the semicircular screening-plate, and the circumferential grooves on the end of the rotator and the flue-mouth, as described.

5. The semicircular angle-iron, in combination with the perforated pipe, whereby the water is prevented from entering the neck-joint, as and for the purposes described.

In testimony that I claim the foregoing I have hereunto set my hand and seal this 23d day of May, 1876.

C. WILLIAM SIEMENS. [L. S.]

Witnesses:
   CHAS. ROCHE,
   J. S. ROBINS,
   *Both of 2 Waterloo Place,*
    *Pall Mall, London, Notary's Clerks.*